Jan. 27, 1959   J. R. R. HARTER   2,871,287
PHOTOGRAPHIC REPRODUCTION METHOD AND APPARATUS
Filed June 11, 1953
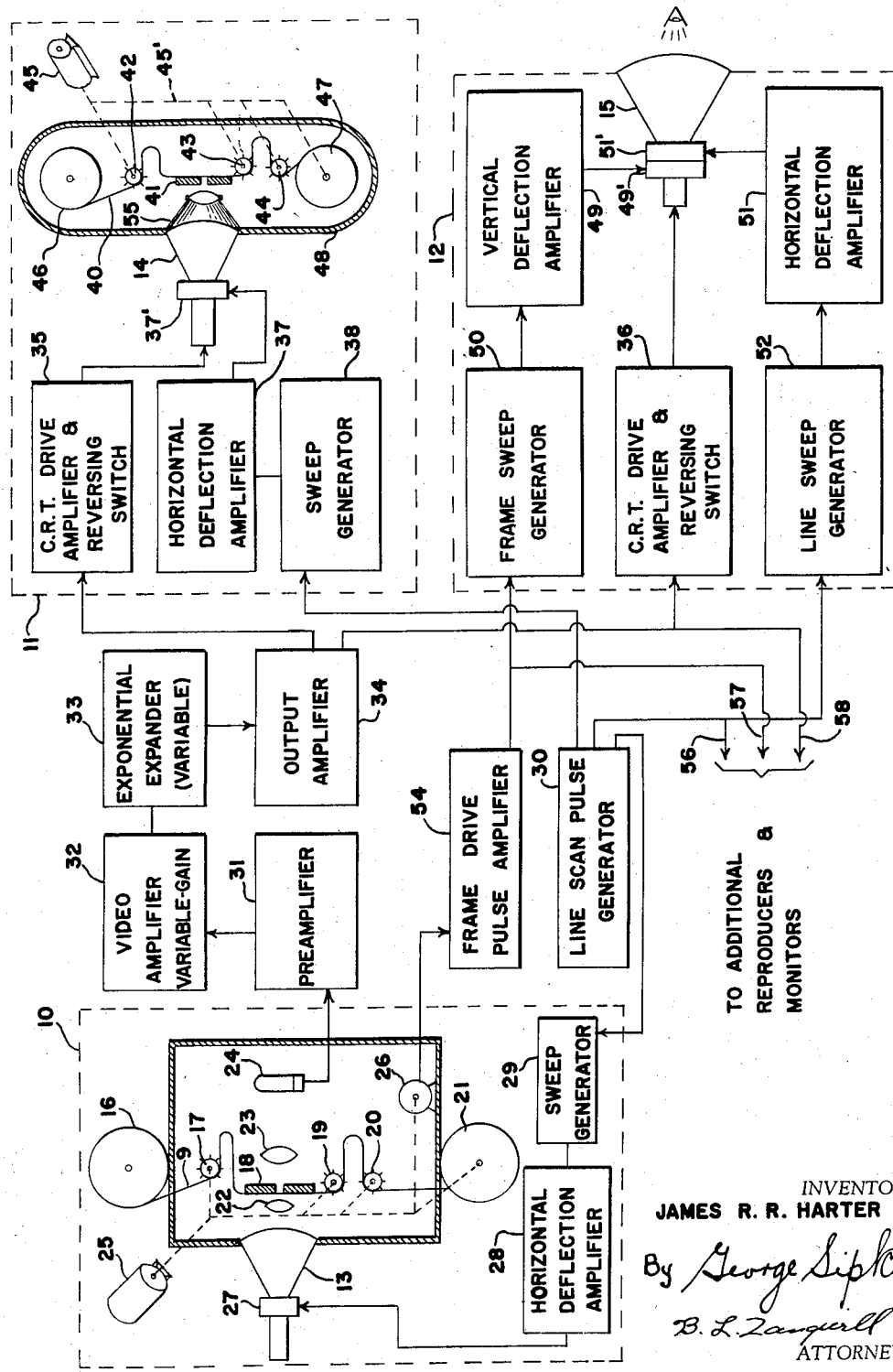
INVENTOR
JAMES R. R. HARTER
By George Sipkin
B. L. Zanguell
ATTORNEYS

United States Patent Office 2,871,287
Patented Jan. 27, 1959

2,871,287

PHOTOGRAPHIC REPRODUCTION METHOD AND APPARATUS

James R. R. Harter, Washington, D. C.

Application June 11, 1953, Serial No. 361,099

1 Claim. (Cl. 178—6.7)

(Granted under Title 35, U. S. Code (1952), sec. 266)

The invention described herein may be manufactured and used by or for the Government of the United States of America for governmental purposes without the payment of any royalties thereon or therefor.

This invention relates in general to photographic viewing and printing or duplicating devices. More particularly it relates to apparatus allowing continuous control of contrast or gamma in a reproduction system which may be used either for viewing or for the printing or duplicating of film images. Either positive or negative reproduction of the original images may be obtained for either purpose.

In many instances it is desirable to be able either to view images stored on photographic film or to reproduce either a positive or a negative copy of such images. Perhaps one of the simplest ways to do this is to utilize light transmitted through the film. This may involve viewing the film, contact printing or projection of light through the film on to a suitable screen or sensitized surface. In either method the image is reproduced as contained on the film. In certain instances it is desirable to modify the characteristics of the reproduced images from those stored on the film, so that, by way of example, a negative may be viewed as a positive and the degree of contrast or gamma of the images may be altered at will to provide more pleasing viewing or better duplication. Color printing processes particularly demand control of contrast to preserve proper color balance in the finished reproduction. Such contrast modification has been available in the past in the printing process whereby a positive print of controlled or altered contrast may be made from a negative. In such a process the finished print cannot be checked for proper contrast until the process is complete. Such a photographic process is now well known and standardized, however, it imposes additional delay in the overall processing. In many instances this delay in processing is intolerable requiring that some faster reversal viewing and contrast control method be available.

Accordingly, it is an object of the present invention to provide a photograph viewing or duplicating system of novel structure.

Another object of the present invention is to provide a photograph reproducing system capable of direct reversing and continuous contrast compensation or control during the reproduction process.

Another object of the present invention is to provide a viewing and reproduction apparatus for in motion viewing of motion picture film whereby direct tone reversal of the film images together with contrast alteration may be obtained.

Another object of the present invention is to provide a film viewer and exposure device for viewing and exposing negative or positive films as either negatives or positive as desired.

Other and further objects and features of the present invention will become apparent upon a careful consideration of the following detailed description and the accompanying drawings wherein:

The single figure of the drawing is a schematic diagram principally in block form showing a specific embodiment of the features of the present invention.

In accordance with the principles of the present invention a photograph viewing and reproducing device is provided which will reproduce images that have been placed on some photographic medium such as a sequence of individual photographs on movie film which are taken in rapid succession and intended to be reproduced in rapid succession whereby the illusion of motion is created.

In the conventional photographic process, the film which is originally exposed to the light to "take" pictures becomes, after development, a negative wherein the dark portions of the scene photographed appear as light portions and vice versa. From this negative must then be produced the positives which possess the proper relationship of black to white as existed in the scene photographed. The production of such a positive requires almost as much time as the production of the original negative because, in contact with the developed negative, it must be exposed to light passing through the negative, then developed and dried by substantially the same process as the negative was developed. In this process compensation for errors due to over or under exposure of the negative may be made at the time of printing by adjusting the amount of light used in exposing the positives or by using film with selected contrast characteristics.

Another method whereby movie film is developed is the reversal process wherein the originally exposed film itself is converted into a positive. This process requires special film and several additional steps in processing so that it is somewhat more costly than the production of either a single negative or a positive in the first mentioned process so that it is usually not employed where several "positives" are to be made. In this process also, exposure compensation may be introduced if needed.

By employing the teachings of the present invention, wherein electronic circuitry is inserted into the picture reproduction process, a degree of flexibility, speed and convenience hitherto unknown has been introduced into the picture reproduction art. The principles of the present invention are equally applicable to the reproduction of "still" pictures as to the reproduction of moving pictures, however because of the peculiar requirements of motion picture reproduction the apparatus of the present invention finds its greatest utility in connection with motion picture films.

By means of the apparatus of the present invention it is possible to view developed film, selecting operation either with or without reversal merely by the operation of a switch, to introduce any desired contrast compensation by the operation of electrical controls and to expose film either as a negative or a positive from either a negative or a positive original. The contrast and density control obtainable is dynamic and continuous, that is, they may be altered at will to suit the needs of the particular section of film being processed at any given instant.

Briefly described the apparatus of the present invention scans the film to be reproduced containing preferably a series of repetitive pictures, the scanning occurring at a uniform rate while the film is in uniform motion, the scanning taking place a line at a time in a series of narrow parallel lines substantially perpendicular to the direction of the film motion. Scanning is performed using a cathode ray tube having a short persistence screen as a light source, the face thereof being scanned repetitively with deflection in one plane only. Light thus produced on the face of the cathode ray tube is focussed through the film and picked up on the opposite side by a phototube. The phototube thus produces an output signal with amplitude variations therein dependent upon the light transmitted through the film. The output signal is amplified and delivered through a suitable non-linear amplifier providing a selectable form of distortion for contrast adjustment and then delivered as an intensity modulation signal for viewing on another cathode ray tube wherein deflection in one plane is provided in synchronism with the original parallel line scanning, and deflection in another plane is perpendicular to the first plane and in synchronism with the rate at which repetitive pictures occur in the pickup scanning. In addition to instantaneous viewing, the apparatus of the present invention also exposes film for permanent record purposes by means of a third cathode ray tube which is intensity modulated by the signal from the phototube, suitably amplified, and deflected in one plane in synchronism with the deflection in the first cathode ray tube, the light from this third cathode ray tube being focussed to fall on the film to be exposed. Film exposure is undertaken with the film traveling at a constant speed synchronized with the travel of the film to be reproduced, the film to be exposed traveling in a direction substantially perpendicular to the plane of deflection in the third cathode ray tube.

With reference now to the single figure of the drawing, the apparatus shown therein includes two film handling units 10, 11 and a viewing device 12. In each of the components is disposed a cathode ray tube 13, 14 and 15, respectively which are shown minus obvious circuit connections such as to heaters, grids and anodes to avoid undue circuit complexity. Unit 10 may be more fully designated as the film scanning unit, or flying spot scanner, wherein film to be reproduced is inserted and scanned progressively.

In the typical apparatus herein described provision is made primarily for handling conventional motion picture film, for example, film of the 35-millimeter size, wherein successive pictures on the film were originally taken of a scene at a selected frame recurrence rate and when reproduced at that rate with a movie projector will give the illusion of reproducing motion originally present in the scene or field of view of the camera.

In addition to the cathode ray tube 13, the film scanning unit 10 includes the film handling mechanism of supply reel 16, sprocket 17, film pressure aperture plate 18, sprockets 19 and 20, take-up reel 21, lens systems indicated at 22 and 23, phototube 24, drive motor 25, and film rate pulse generator 26. Horizontal deflection means at 27 is schematically indicated for tube 13, and is shown as being of the conventional electromagnetic type. Electrostatic means could be used in place of the electromagnetic means. To avoid undue circuit complexity, connections to the base of tube 13 as well as connections to the accelerating anode have been omitted. These elements are conventional and form no part of the present invention.

The deflection means 27 which may be of the magnetic type such as a yoke is connected to a horizontal deflection amplifier 28 which in turn is connected through a sweep generator 29 to line scan pulse generator 30. Line scan pulse generator 30 produces a sequence of triggering pulses at a selected recurrence rate, typically 20 Kc. per second, which pulses are employed to control the frequency of operation of the sweep generator 29 to produce a signal which after amplifiation by horizontal deflection amplifier 28 is of suitable character to produce deflection of the beam in cathode ray tube 13.

Phototube 24 is connected to a preamplifier 31, the output of which goes to a video amplifier 32. Incorporated into video amplifier 32 is a suitable linear gain control for adjusting the amplification of the amplifier to insert a first form of adjustable compensation into the playback signal. This adjustment will determine the level of the signal and hence the intensity of the reproduced image.

Connected to the video amplifier 32 is an exponential expanded amplifier 33, which provides different amplification for signals of certain amplitudes than for signals of certain other amplitudes, thus emphasizing variations at certain portions of the contrast range and minimizing variations at other portions of the contrast range. This device inserts a second form of compensation for contrast namely, gamma compensation. Such amplifiers are well known in the art.

Exponential expander 33 is connected to an impedance transformation device, output amplifier 34, which provides a plurality of low output impedance circuits carrying the amplified and contrast compensated signals picked up by the phototube 24.

In the apparatus of the drawing, the output amplifier 34 is connected to both the film handling unit 11 and the viewing device 12, being connected to the driver amplifiers 35 and 36 and thence to either the control grid or cathode of the cathode ray tubes 14 and 15 as appropriate to produce intensity modulation of the electron beam of these tubes. Driver amplifiers 35 and 36 contain suitable signal inversion equipment such as reversing switches which may be operated at will so that the polarity of the signal from output amplifier 34 may be altered to produce either negative or positive images at the devices 11 and 12. Cathode ray tube 14 receives deflection signals from the horizontal deflection amplifier 37 which in turn is connected through sweep generator 38 to the line scan pulse generator 30. In the apparatus shown, tube 14 receives no other deflection signal, the beam being deflected in only one plane just as in the case of cathode ray tube 13. Also for all practical purposes the deflection amplifiers 28 and 37 may be similar, likewise the sweep generators 29 and 38.

Light produced on the face of cathode ray tube 14 is focussed by lens 39 to impinge on film 40 in the region of pressure plate 41. For this purpose the pressure plate 41 possesses an aperture which is properly described as a narrow slit disposed substantially perpendicular to the film travel as contrasted to the aperture normally encountered in movie work. Film 40 is moved through the pressure plate 41 at a uniform, constant velocity by rotation of sprockets 42, 43 and 44 which preferably are geared or otherwise positively driven by a synchronous motor 45. The mechanical drive for the sprockets and reels is indicated schematically by the dotted lines 45'. Film 40 is withdrawn from supply reel 46 and after exposure is stored by the take-up reel 47 also driven by motor 45. A light-proof cover 48 encloses the reels, sprockets and pressure plate to prevent light from reaching the film except from the face of the cathode. In many instances it may be desirable also to enclose a portion of all of tube 14 as a further safeguard against the entry of undesired light and to make provisions for the blocking of light emanating from the filament of tube 14. A shield for this purpose in the form of a truncated cone is shown at 55.

The monitor or viewing device 12 contains, in addition to the cathode ray tube 15 and driver amplifier 36 previously mentioned, the frame or vertical deflection amplifier 49, frame sweep generator 50, the line or horizontal deflection amplifier 51 and the line sweep generator 52.

Horizontal deflection amplifier 51 feeding horizontal deflection means 51' is driven by line sweep generator 52 which is connected to the line scan pulse generator 30 to receive the same trigger pulses as those delivered to sweep generator 29 so that horizontal or line sweeps of cathode ray tubes 13 and 15 are synchronized. Frame deflection amplifier 49 is driven by frame sweep generator 50 which is connected to the frame drive pulse amplifier 54 which in turn is connected to magneto 26. Magneto 26 is connected to the film drive sprockets of unit 10 to provide a series of impulses at the rate at which individual picture "frames" pass through the film pressure plate 18 to synchronize the frame sweep of cathode ray tube 15 to the frame rate in unit 10. Each pulse produced by magneto 26 starts the sweep in frame sweep generator 50 necessary, to vertically deflect the beam of cathode ray tube 15 for each frame of the film. This sweep voltage is applied through vertical deflection amplifier 49 to the vertical deflection means 49' of tube 15.

In operation of the apparatus shown, a film 9 to be reproduced is placed in the position of the supply reel 16, threaded over sprocket 17, through film pressure plate 18, over sprockets 19 and 20 and started on the take-up reel 21. A film 40, to be exposed is then placed on supply reel 46, threaded over sprocket 42, through pressure plate 41, over sprockets 43 and 44 and started on the take-up reel 47. The electrical circuitry within the blocks as well as the cathode ray tubes 13, 14 and 15 are turned on to permit them to warm up and attain stability. During this warm-up period which pereferably occupies several minutes it is desirable to reduce the brilliance of the cathode ray tubes particularly that of tube 15 to avoid damage to the screens. Such a precaution is not so important where the frame sweep generator 50 is of a normally operative type and is merely synchronized by periodic signals from the pulse generator 26, however when the frame sweep generator is of the "slave" type, inoperative unless triggered by signals from the pulse generator 26, some brilliance reduction is desired because under such conditions there is no vertical sweep of cathode ray tube 15 when the mechanism of scanning unit is inoperative. Numerous known contemporary scan interlocked cathode ray tube bias protective circuits will do this successfully.

When the apparatus has warmed up sufficiently to be used, the synchronous motors 25 and 45 are energized simultaneously. These motors, being of the synchronous type, will normally drive the films in units 10 and 11 at the same uniform speed. Additional systems of a type well known in the art may be provided if necessary to maintain exact synchronism of film travel. The film 9 traveling at a uniform rate of speed is scanned repeatedly, a line at a time, by the light from the cathode ray tube 13. Light from the tube 13 is passed through the lens 22, the film 9 and lens 23 to phototube 24. The signal from phototube 24 passes through preamplifier 31, video amplifier 32, the exponential expander 33, and the output amplifier 34. Here the signal splits, a portion thereof being fed by way of the cathode ray tube drive amplifier and polarity switch 35 to cathode ray tube 14. Cathode ray tube 14 delivers light to expose the film 40. The polarity reversing switch included in block 35 permits selectable electrical reversal of the signal polarity to provide either a negative or a positive film 40 regardless of whether the original film 9 was a negative or a positive.

The other portion of the signal output of amplifier 34 is fed through cathode ray tube drive amplifier and polarity switch 36 to cathode ray tube 15. The cathode ray tube 15 in the monitor device 12 provides visual indication of the image on the film 9 running through unit 10, also either as a negative or as a positive depending upon the position of the polarity selector switch in block 36. Cathode ray tube 15 receives the same horizontal deflection signals as the cathode ray tubes 13 and 14 and additionally receives a vertical deflection signal which is timed with the progression of film through the unit 10 so that the vertical frame frequency of unit 15 is equal to the rate at which individual pictures pass through the film pressure plate 18 of unit 10. The operator observing the representation on tube 15 can control the intensity and the degree of contrast of the reproduced images by control of the video amplifier 32 and the exponential expander circuit 33 respectively. He thus is able to exercise continuous control of the light delivered to the film 40 being exposed.

The basic system described above is adaptable to many uses. It is obvious that a continuous indication of the nature and extent of a correction being effected on a finished print, copy, or reversal film is very desirable. Factors such as exposure time, development process time and temperature or the contrast capabilities of the film being exposed.

The apparatus disclosed is particularly adaptable to the control of color balance in the exposure of color films or papers. Color filters may be used between the cathode ray tube 13 and the film 9 and between cathode ray tube 14 and the film 40. A filter mounting arrangement suitable for this purpose is shown, for example, by the patent to Simmon 2,499,039 issued February 28, 1950. By observation of the monitor cathode ray tube 15 and use of the gain and expander controls the operator may obtain the desired exposure and contrast for each color component in the finished print or copy.

Mechanical scanning systems such as those shown in the patent to Barnes et al. 2,262,156 issued November 11, 1941 obviously may be used in place of the cathode ray tube systems shown and various optical systems known to the art may be used, if desired, in place of the simple lens systems shown in the drawing. The system disclosed need not depend upon light transmitter through a film. Light reflected from an object and applied to a conventional television camera or inconoscope may supply the signal input to the preamplifier 31. The horizontal scanning frequency then used for cathode ray tubes 14 and 15 will be that developed for the inconoscope.

Lines 56, 57 and 58 may be taken out from line scan pulse generator 30, frame drive pulse amplifier 54 and output amplifier 34. These lines may be used to feed additional reproduction and monitor units as indicated on the drawing. These additional units would be duplicates of the apparatus shown in the blocks 11 and 12 respectively. By the addition of such other units the film being processed may be duplicated in as many copies as desired, and additional monitoring or viewing units may be provided. Coaxial lines should be used for this purpose.

While the system has been described in terms of the reproduction of movie film it is readily apparent that the system is equally applicable to the processing of still photographs. The only modification of the apparatus shown required for such use is that of the film handling and drive mechanism to adapt it to handle the type of film used. The mechanical means for handling and driving any known type of film through processing devices are well known in the art.

It will be apparent that the concept of continuous control of the photographic process herein disclosed results in a considerable saving of materials and time over the prior art methods. The evaluation of the film being processed is continuous and control may be exercised to meet any observed deviation in the intensity or contrast of the subject being processed.

Obviously many modifications on variations of the present invention are possible in the light of the above teachings. It is therefore understood that within the scope of the appended claims the invention may be practiced otherwise than as specifically described.

What is claimed is:

A photographic reproduction system comprising a first film having images recorded thereon, a first film transport mechanism for moving said first film at a relatively constant speed, said first film transport mechanism including a constant speed drive motor and a film rate pulse generator, a first cathode ray tube scanning element mounted in proximity to said first film and producing a movable spot source of light, a scan pulse generator, first means responsive to said scan pulse generator for deflecting the spot source of light for scanning the first film transversely to its direction of motion, photoelectric means responsive to light transmitter from said source through said film, a first aperture plate mounted between said first film and said photoelectric means having a narrow slit disposed perpendicular to the direction of motion of said first film, an expander circuit connected to the output of said photoelectric means, means in said expander circuit to alter the degree of expansion of the electrical signal passed by said circuit, and amplifier and polarity reversing switches serially connected to said expander circuit, a second film to be exposed, a second film transport mechanism having a constant speed drive motor for moving said second film at substantially the same speed as said first film, a second cathode ray tube mounted in proximity to said second film, means to produce a second movable spot source of light on the face of said second cathode ray tube, second means responsive to said scan pulse generator for deflecting said second movable spot source of light for scanning said second film in synchronism with the scan movement of the first spot source of light, a second aperture plate mounted between said cathode ray tube and said film having a narrow slit disposed perpendicular to the direction of motion of said second film, means to modulate the intensity of said second spot source of light in response to fluctuations of said expanded electrical signal, and a third cathode ray tube responsive to the output from said amplifier, said film rate pulse generator and said scan pulse generator for producing a visual image of the recorded images on the first film as altered by the operation of the expander circuit.

References Cited in the file of this patent

UNITED STATES PATENTS

| | | |
|---|---|---|
| 2,189,351 | Schroter | Feb. 6, 1940 |
| 2,219,120 | Somers | Oct. 22, 1940 |
| 2,301,199 | Bruce et al. | Nov. 10, 1942 |
| 2,313,542 | Hall et al. | Mar. 9, 1943 |
| 2,509,987 | Newman | May 30, 1950 |
| 2,525,891 | Garman | Oct. 17, 1950 |
| 2,546,466 | Marzan | Mar. 27, 1951 |
| 2,607,845 | Clark | Aug. 19, 1952 |

OTHER REFERENCES

Video Recordings Improved by the Use of Continuously Moving Film, "Tele-Tech" magazine for November 1950, pages 32–35, 62 and 63.